United States Patent
Cho et al.

(10) Patent No.: US 8,934,905 B2
(45) Date of Patent: Jan. 13, 2015

(54) MULTIMODE TERMINAL AND METHOD FOR RELAYING MOBILE COMMUNICATION USING THE SAME

(71) Applicant: Electronics and Telecommunications Research Institute, Daejeon (KR)

(72) Inventors: Yunhee Cho, Daejeon (KR); Jae Su Song, Daejeon (KR); Seung-Hwan Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/718,520

(22) Filed: Dec. 18, 2012

(65) Prior Publication Data
US 2013/0331093 A1  Dec. 12, 2013

(30) Foreign Application Priority Data
Jun. 7, 2012  (KR) .......................... 10-2012-0060889

(51) Int. Cl.
*H04W 88/06*  (2009.01)
*H04W 88/08*  (2009.01)
*H04B 7/14*  (2006.01)
*H04W 88/04*  (2009.01)

(52) U.S. Cl.
CPC ................. *H04B 7/14* (2013.01); *H04W 88/04* (2013.01); *H04W 88/06* (2013.01)
USPC .......................................... 455/436; 370/319

(58) Field of Classification Search
CPC ...... H04W 16/26; H04W 40/10; H04W 88/08
USPC .......................... 370/311, 319; 455/436, 561
See application file for complete search history.

(56) References Cited

U.S. PATENT DOCUMENTS

| 2008/0285504 A1* | 11/2008 | Lin ................................ 370/319 |
| 2010/0135195 A1* | 6/2010 | Sakoda ........................ 370/311 |
| 2012/0264430 A1* | 10/2012 | Kim et al. ..................... 455/436 |

FOREIGN PATENT DOCUMENTS

| KR | 1020090095410 | 9/2009 |
| KR | 1020100133294 | 12/2010 |

OTHER PUBLICATIONS

Levy-Bencheton, Cedric et al., "Power consumption optimization in multi-mode mobile relay," EuWIT 2009, European Wireless Technology Conference, pp. 61-64 (2009).

*Primary Examiner* — Myron K Wyche
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed are a multimode terminal that may simultaneously enhance utilization of a device and efficiency of a network by enabling a mobile terminal supporting a plurality of communication schemes to additionally support a relay function, and a method of relaying communication using the multimode terminal. A communication relay method of a multimode terminal according to an exemplary embodiment of the present disclosure includes: searching, by a base station, for terminals that support a plurality of communication schemes; selecting, by the base station from among the searched terminals, a relay terminal that satisfies a predetermined condition for performing a multimode relay function; requesting, by the base station, the relay terminal to perform the multimode relay function; and relaying, by the relay terminal in response to the request of the base station, communication between the base station and a target terminal.

14 Claims, 8 Drawing Sheets

MULTIMODE TERMINAL AND METHOD FOR RELAYING MOBILE COMMUNICATION USING THE SAME

CROSS-REFERENCE TO RELATED APPLICATIONS

This application is based on and claims priority from Korean Patent Application No. 10-2012-0060889, filed on Jun. 7, 2012, with the Korean Intellectual Property Office, the disclosure of which is incorporated herein in its entirety by reference.

TECHNICAL FIELD

The present disclosure relates to a multimode terminal that supports a plurality of communication schemes and a method of performing communication relay between a base station and a terminal using the multimode terminal.

BACKGROUND

In most cases, an existing mobile terminal supports only a single communication scheme (for example, a code division multiple access (CDMA) or a global system for mobile communications (GSM)). Therefore, a terminal that has subscribed to a service using a predetermined communication scheme may be provided with a communication service only in a corresponding service system. Due to a different communication scheme for each country or region, a region in which a user cannot be provided with a service using a single terminal has occurred.

Currently, multimode terminals capable of selectively accessing wireless networks of various schemes by applying a plurality of communication schemes to a single mobile terminal, such as a smart phone, are widely distributed and thereby utilized. Producers of such mobile terminals are continuously making an effort to expand a seamless service region by applying further various communication schemes to a single terminal device.

However, when a single communication scheme is selected in a terminal supporting a plurality of communication schemes, there occurs inefficiency that most of the modules associated with remaining communication schemes do not operate.

SUMMARY

The present disclosure has been made in an effort to provide a multimode terminal that may simultaneously enhance utilization of a device and efficiency of a network by enabling a mobile terminal supporting a plurality of communication schemes to additionally support a relay function, and a method of relaying communication using the multimode terminal.

An exemplary embodiment of the present disclosure provides a communication relay method of a multimode terminal, the method including: searching, by a base station, for terminals that support a plurality of communication schemes; selecting, by the base station from among the searched terminals, a relay terminal that satisfies a predetermined condition for performing a multimode relay function; requesting, by the base station, the relay terminal to perform the multimode relay function; and relaying, by the relay terminal in response to the request of the base station, communication between the base station and a target terminal. The communication relay method may further include suspending the communication relay in response to a request of the base station or the relay terminal during the communication relay.

At the same time of operating as a general mobile communication terminal using a predetermined communication scheme, the relay terminal may perform the multimode relay function using a communication scheme different from the predetermined communication scheme.

The selecting, by the base station, the relay terminal that satisfies the predetermined condition may include at least one of: verifying whether a terminal is providing the multimode relay function; verifying whether a channel state of the terminal is greater than or equal to a predetermined level; and verifying whether a remaining battery amount of the terminal is greater than or equal to a predetermined value.

When the communication relay is not required, or when a communication relay performance of the relay terminal is degraded to be less than the predetermined level, the base station may make a request for suspending the communication relay. When providing of the multimode relay function is suspended by a user, when the remaining battery amount is decreased to be less than the predetermined level, or when the channel state is degraded to be less than the predetermined level, the relay terminal may make a request for suspending the communication relay.

Another exemplary embodiment of the present disclosure provides a communication relay method of a multimode terminal, the method including: requesting, by a relay request base station, a serving base station for cooperation of multimode relay; searching, by the serving base station in response to the cooperation request, for terminals that support a plurality of communication schemes, and selecting a terminal candidate group that satisfies a predetermined condition; transferring, by the serving base station, a multimode relay request of the relay request base station to terminals that belong to the terminal candidate group; transmitting, by the terminals of the terminal candidate group in response to the multimode relay request, the respective channel state information of the terminals to the relay request base station; selecting, by the relay request base station, a relay terminal based on the transmitted channel state information of the terminals; requesting, by the relay request base station, the relay terminal to perform a multimode relay function; and relaying, by the relay terminal in response to the request of the relay request base station, communication between the relay request base station and a target terminal. The relay communication method may further include suspending the communication relay in response to a request of the relay request base station or the relay terminal during the communication relay.

The selecting, by the serving base station, the terminal candidate group that satisfies the predetermined condition may include at least one of: verifying whether a terminal is positioned at a position accessible to the relay request base station and the target terminal; verifying whether the terminal supports a communication scheme requested by the relay request base station; verifying whether the terminal is providing the multimode relay function; and verifying whether a remaining battery amount of the terminal is greater than or equal to a predetermined value.

Still another exemplary embodiment of the present disclosure provides a multimode terminal, including: a plurality of communication modules to support a plurality of communication schemes; and a multimode relay module to relay communication between a base station and a target terminal through a communication module that is not being currently utilized by a terminal among the plurality of communication modules, in response to a request of the base station.

The multimode relay module may include: an on/off setting unit to provide a user with a setting function about whether to utilize a multimode relay function; a channel management unit to determine whether a terminal is capable of performing the multimode relay function by measuring a channel state of the terminal with respect to a communication scheme requested by the base station; a battery management unit to determine whether the terminal is capable of performing the multimode relay function by monitoring a remaining battery amount of the terminal; and a communication control unit to relay communication between the base station and the target terminal, or to suspend the communication relay by accepting the request of the base station based on a setting state of the on/off setting unit and the determination result of the channel management unit and the battery management unit. The multimode relay module may further include a state display unit to display whether the terminal is currently performing the multimode relay function, and/or resource usage amount information of the terminal through the communication relay.

According to the exemplary embodiments of the present disclosure, it is possible to simultaneously enhance utilization of a device and efficiency of a network by enabling a mobile terminal supporting a plurality of communication schemes to additionally support a relay function. That is, effects such as coverage expansion of a base station, minimization of power communication, increase of data transmission capacity, and the like may be achieved The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

In the present disclosure a "multimode terminal" has the following characteristics.

First, the multimode terminal has a module that supports a plurality of communication schemes (for example, a code division multiple access (CDMA), a global system for mobile communications (GSM), and the like). The multimode terminal may have a plurality of communication modules that supports the plurality of communication schemes, respectively, or may support the plurality of communication schemes through a software defined radio (SDR) function.

Second, the multimode terminal may perform a multimode relay (hereinafter, MRS) function. MRS indicates that a terminal performs a repeater function with respect to another communication scheme at the same time of operating as a general mobile communication terminal through a predetermined communication scheme. That is, the MRS indicates providing, as a repeater with respect to another terminal, a communication module that is not being currently utilized for communication with a serving base station within the multimode terminal.

Third, the MRS function enables on/off based on a setting of a user of the multimode terminal.

Fourth, when a remaining battery amount of the multimode terminal is decreased to be less than a predetermined value, performing of the MRS function may be limited even though the MRS function is in an on state.

Fifth, when the multimode terminal employs a resource of the multimode terminal for communication relay with another terminal, a resource usage amount of the multimode terminal occurring due to the communication relay may be verified by a base station and a network provider. An incentive may be assigned in proportion to the resource usage amount.

Sixth, the multimode terminal may perform only a downlink relay function, may perform only an uplink relay function, or may perform all of the downlink relay function and the uplink relay function.

Seventh, a variety of operation scenarios may be present based on an environment between a base station requesting MRS and the multimode terminal supporting the MRS. When an operation scheme of the multimode terminal varies based on the above operation scenario, a battery usage amount according thereto and the like may also vary. Accordingly, an allowance level thereof may be predetermined.

Hereinafter, exemplary embodiments of the present disclosure will be described in detail with reference to the accompanying drawings.

A first exemplary embodiment of the present disclosure relates to a case in which a multimode terminal receives an MRS request from a serving base station of the multimode terminal and performs MRS.

Figure 1:
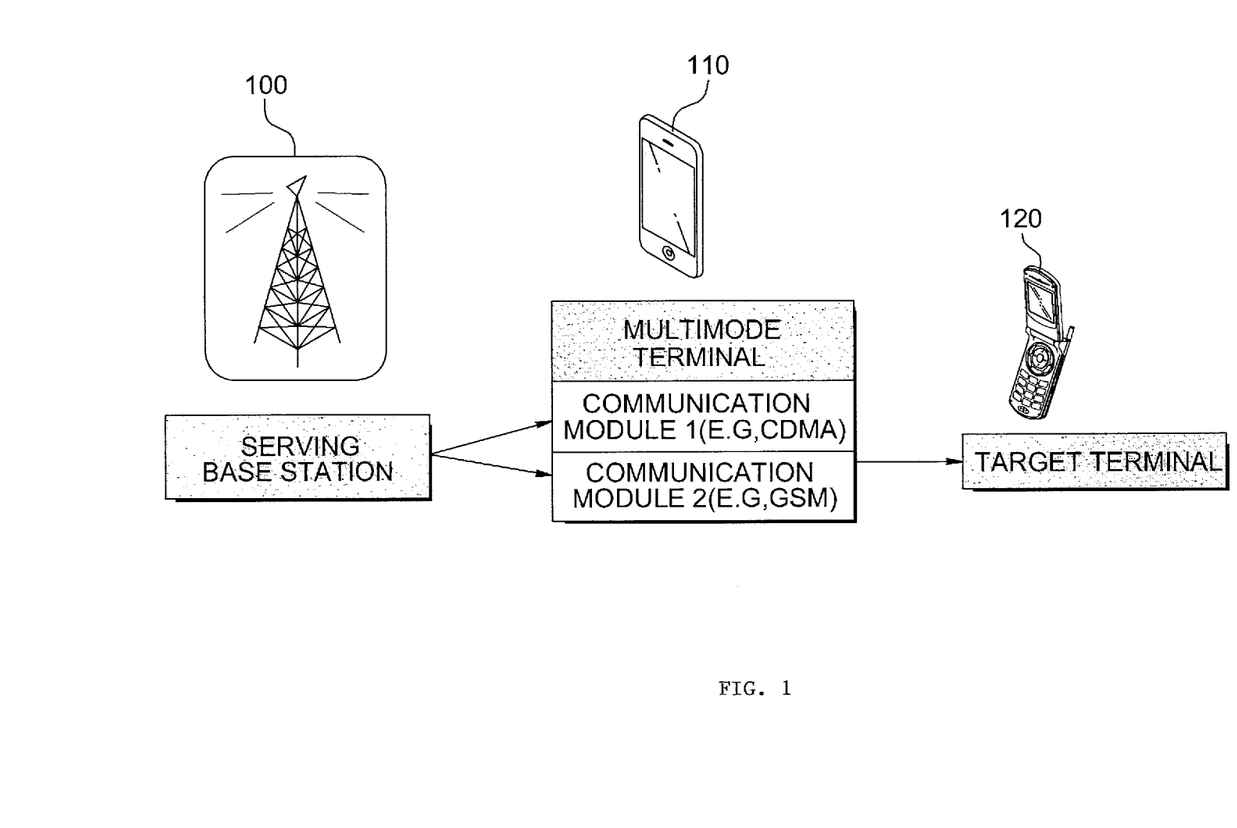
FIG. 1 is a network configuration to describe a communication relay method according to a first exemplary embodiment of the present disclosure.
Figure 2A:
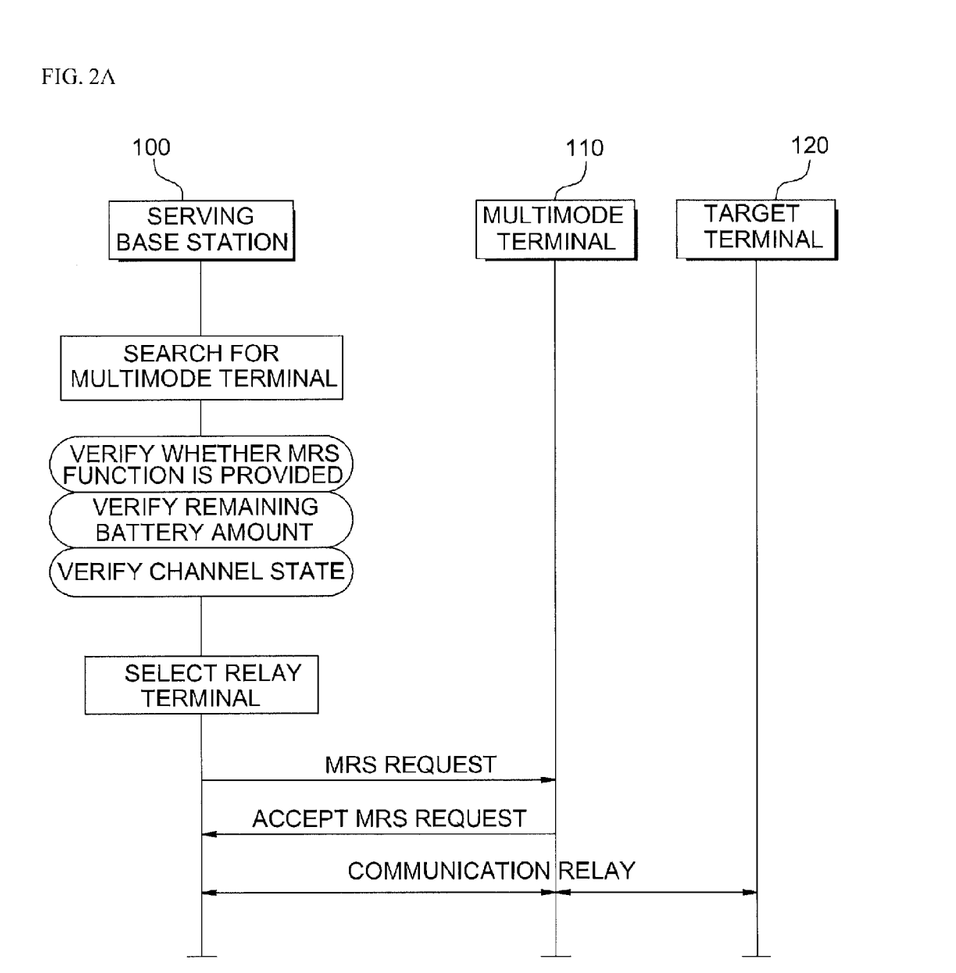
FIGS. 2A through 2C are flowcharts of a communication relay method according to the first exemplary embodiment of the present disclosure.
Figure 2B:
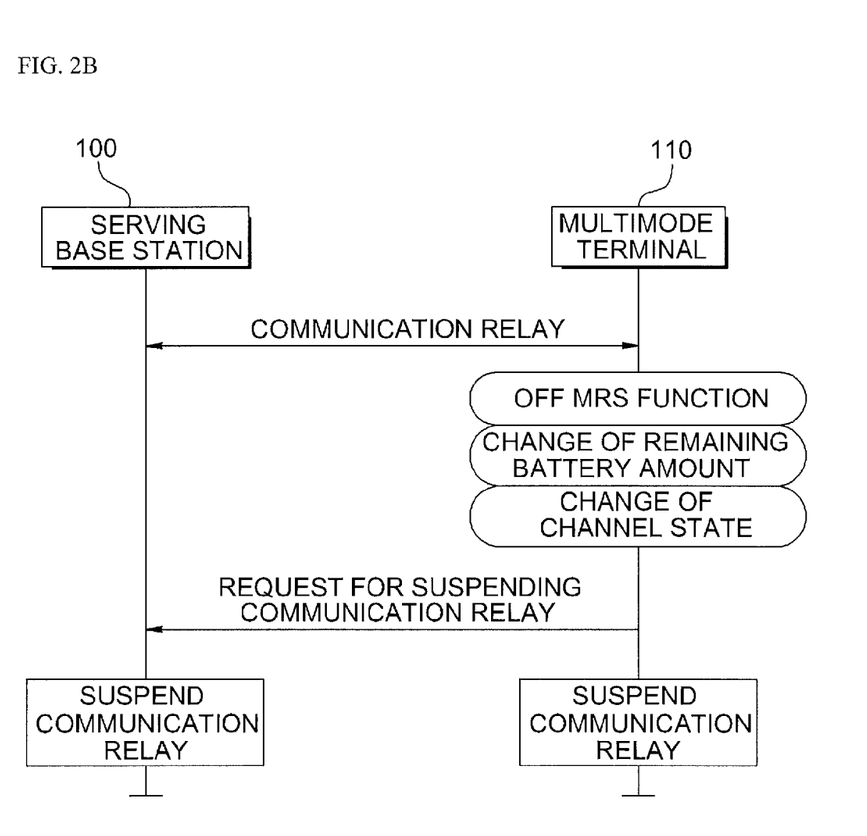
Figure 2C:
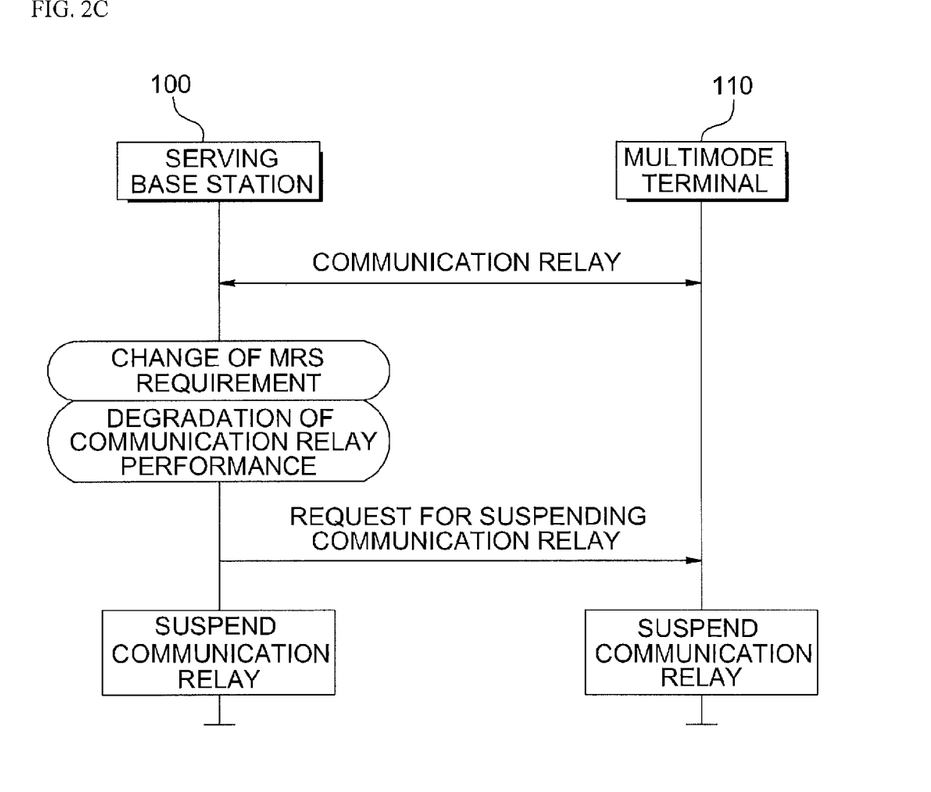

FIG. 1 is a network configuration to describe a communication relay method according to the first exemplary embodiment of the present disclosure, and FIGS. 2A through 2C are flowcharts of the communication relay method according to the first exemplary embodiment of the present disclosure. Specifically, FIG. 2A illustrates a process of requesting and accepting MRS, and FIGS. 2B and 2C illustrate a process of suspending communication relay by a terminal and a base station, respectively.

Referring to FIG. 1 and FIGS. 2A through 2C, a communication network according to the first exemplary embodiment of the present disclosure includes a serving base station 100, and a multimode terminal 110 and a target terminal 120 that are positioned within coverage of the serving base station 100.

The serving base station 100 is aware of information (a position of a terminal, a communication scheme, a channel state, whether an MRS function is on or off, and the like) associated with performing MRS of terminals that communicate with the serving base station 100. Therefore, the serving base station 100 directly selects, as a relay terminal, the multimode terminal 110 that directly supports the MRS function and requests the multimode terminal 110 for the MRS.

When the serving base station 100 selects the relay terminal, the serving base station 100 may go through verifying whether a terminal is providing the MRS function, verifying whether a remaining battery amount of the terminal is greater than or equal to a predetermined value, and verifying whether a channel state of the terminal is greater than or equal to a predetermined level. In this instance, when the selected multimode terminal 110 is capable of measuring a channel state with the target terminal 120, the multimode terminal 110 may transmit the measured channel state to the serving base station 100. When the channel state is poor, the serving base station 100 may select, as the relay terminal, a new terminal that supports the MRS function.

In response to the MRS request, the multimode terminal 110 may automatically perform the MRS function to thereby relay communication between the serving base station 100 and the target terminal 120.

During the communication relay, both the multimode terminal 110 that is performing the MRS function and the serving base station 100 may make a request for suspending the communication relay.

When a user switches off the MRS function, when the remaining battery amount is decreased to be less than the predetermined value, or when the channel state is degraded to be less than the predetermined level, the multimode terminal 110 side may make a suspension request. In this instance, the serving base station 100 accepts the suspension request and immediately searches for another multimode terminal to perform the MRS function.

When the communication relay is not required any more, or when relay performance of the multimode terminal 110 that is currently performing the MRS function is degraded to be less than the predetermined level, the serving base station 100 side may notify the corresponding multimode terminal 110 about suspension. In response to the notification, the multimode terminal 110 suspends performing of the MRS function and enters into a standby mode in which the multimode terminal 110 waits for the MRS request from the base station.

A second exemplary embodiment of the present disclosure relates to a communication relay method in a case where an MRS request base station is different from a serving base station of a multimode terminal that supports MRS, and the MRS request base station and the serving base station mutually make a close cooperation.

Figure 3:
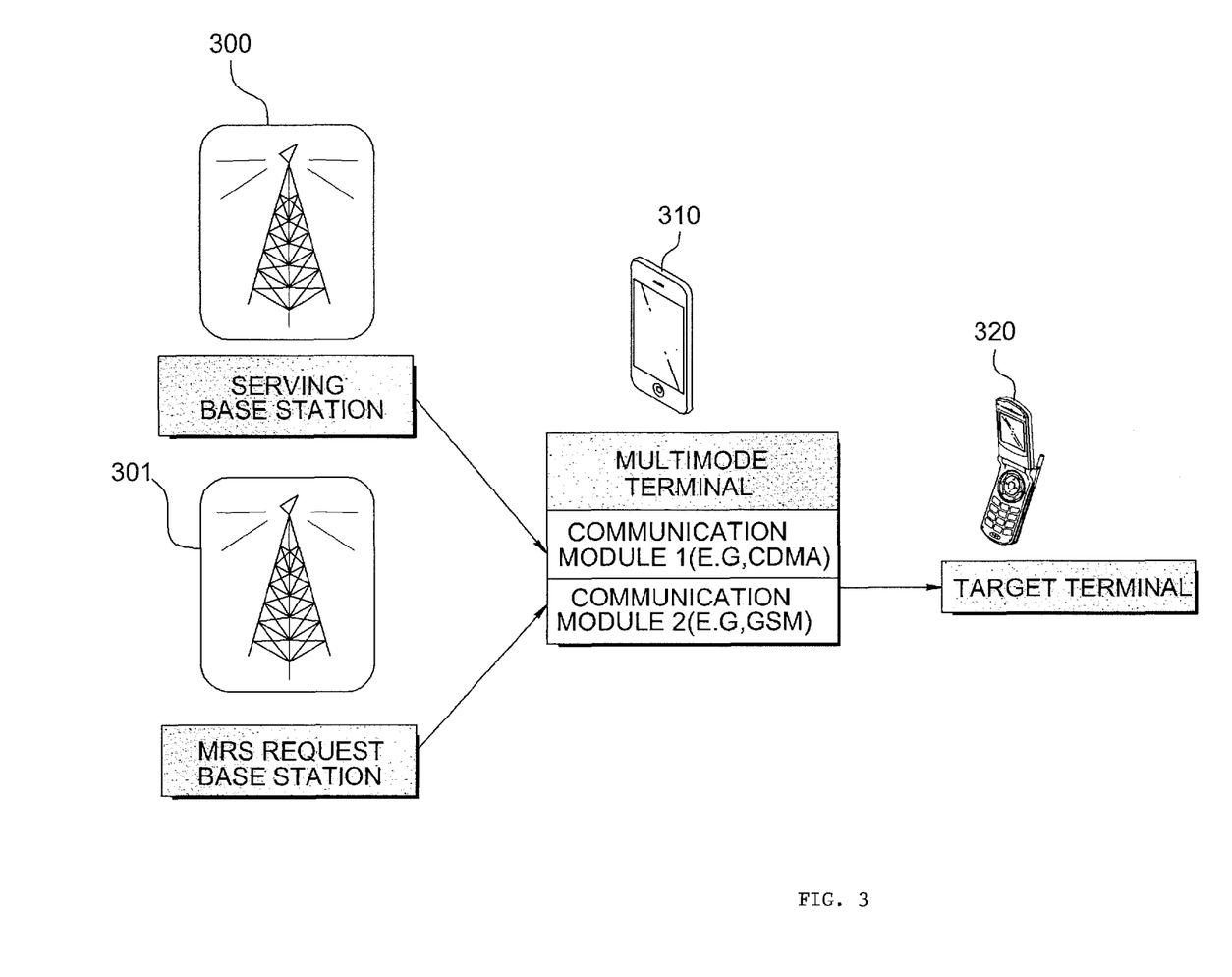
FIG. 3 is a network configuration to describe a communication relay method according to a second exemplary embodiment of the present disclosure.
Figure 4:
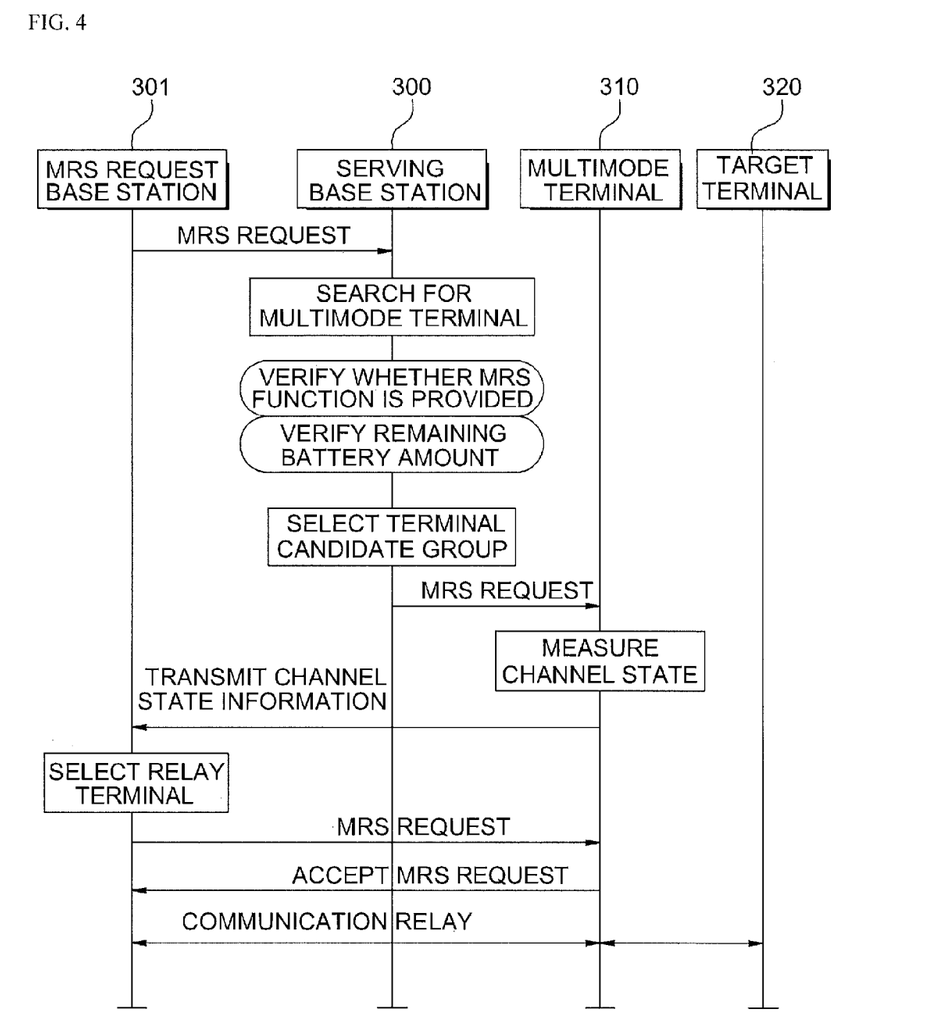
FIG. 4 is a flowchart of a communication relay method according to the second exemplary embodiment of the present disclosure.

FIG. 3 is a network configuration to describe a communication relay method according to the second exemplary embodiment of the present disclosure, and FIG. 4 is a flowchart of the communication relay method according to the second exemplary embodiment of the present disclosure.

Referring to FIGS. 3 and 4, a communication network according to the second exemplary embodiment of the present disclosure includes a serving base station 300, an MRS request base station 301, a multimode terminal 310, and a target terminal 320.

The MRS request base station 301 is in a state closely cooperating with the serving base station 300 and thus, may be aware of a portion (a position of a terminal, a communication scheme, whether an MRS function is on or off, and the like) of information associated with performing MRS of terminals that support an MRS function through the serving base station 300, however, may not be accurately aware of some information (a channel state and the like).

Accordingly, a method of basically selecting a terminal candidate group based on remaining information excluding the channel state and then receiving an actual channel state of each of the terminals that belong to the terminal candidate group and selecting the multimode terminal 310 to perform the MRS function is employed.

Here, there is a method of further narrowing the terminal candidate group. In general, even though a communication scheme is different, or even though a network provider is different, an installation position of a base station may be similar. Accordingly, a channel state between the serving base station 300 and the terminal and a channel state between the MRS request base station 301 and the terminal may be estimated to be generally proportional. Accordingly, the terminal candidate group may be further narrowed based on the estimated channel state.

Referring to a process of requesting and accepting MRS, the MRS request base station 301 makes a request for MRS cooperation by providing the neighboring serving base station 300 in mutual cooperation with information (a position, a communication scheme, a channel state threshold, and the like) of a multimode terminal to perform the MRS function, which is required by the MRS request base station 301.

Next, the serving base station 300 transfers the request of the MRS request base station 301 to terminals of the terminal candidate group that is determined to be appropriate.

Next, each of the terminals of the terminal candidate group measures a channel state using a communication module corresponding to a requested communication scheme, and transmits the measured channel state to the MRS request base station 301. In this instance, the channel state basically indicates a channel state between the MRS request base station 301 and a terminal of the terminal candidate group. When the terminal of the terminal candidate group is capable of measuring a channel state with the target terminal 320, the channel state may further include a channel state between the terminal of the terminal candidate group and the target terminal 320.

Next, based on the channel states transmitted from the terminals of the terminal candidate group, the MRS request base station 301 selects, as the relay terminal, the multimode terminal 310 to perform the MRS function. When all of the transmitted channel states are unsatisfactory, the MRS request base station 301 may repeat the above process by requesting the serving base station 300 about the MRS cooperation again.

Next, the MRS request base station 301 requests the selected multimode terminal 310 to perform the MRS function. In response to the request, the multimode terminal 310 automatically performs the MRS function to relay communication between the MRS request base station 301 and the target terminal 320.

During the communication relay, both of the multimode terminal 310 that is performing the MRS function and the MRS request base station 301 may make a request for suspending the communication relay, which is the same as described above with reference to FIGS. 2B and 2C.

A third exemplary embodiment of the present disclosure relates to a communication relay method in a case where an MRS request base station is different from a serving base station of a multimode terminal that supports MRS and the MRS request base station and the serving base station do not cooperate with each other.

Figure 5:
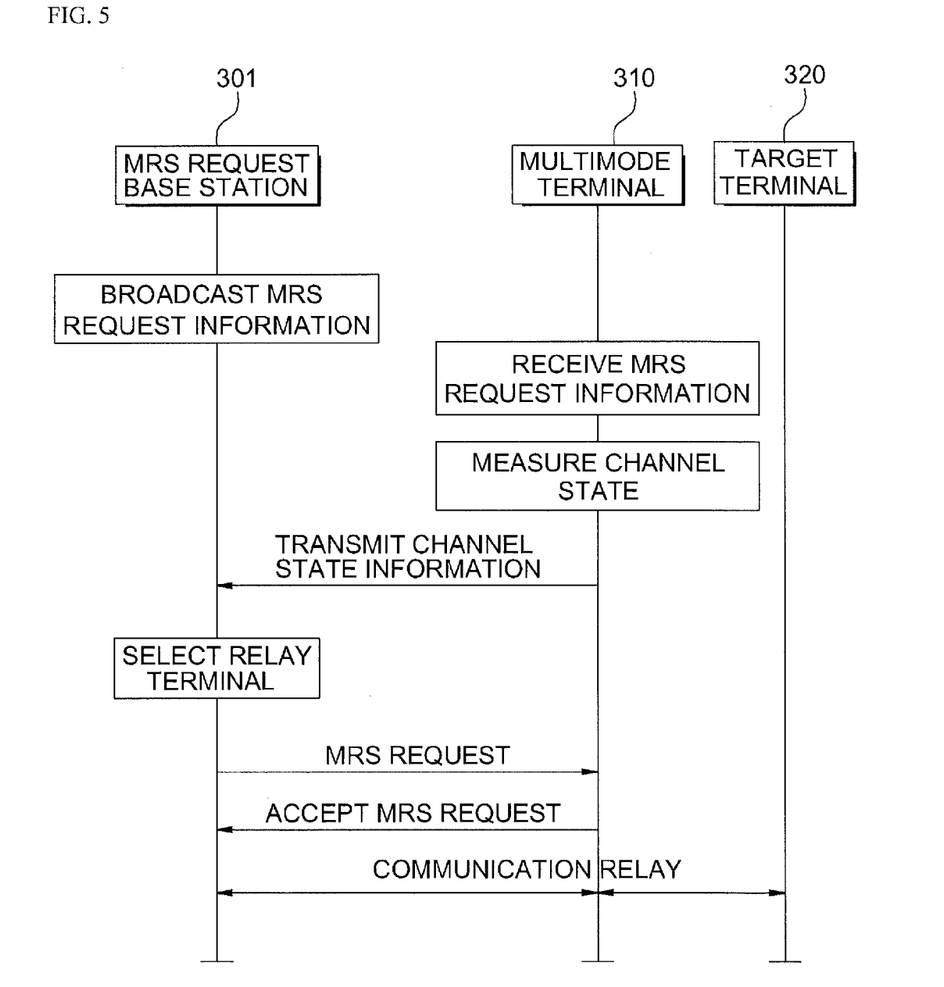
FIG. 5 is a flowchart of a communication relay method according to a third exemplary embodiment of the present disclosure.

FIG. 5 is a flowchart of a communication relay method according to the third exemplary embodiment of the present disclosure. The network configuration is the same as FIG. 3.

Referring to FIGS. 3 and 5, the MRS request base station 301 is not cooperating with the serving base station 300 and thus, is unaware of information (a position, a communication scheme, a channel state, whether an MRS function is on or off, and the like) of a multimode terminal to perform the MRS function. Accordingly, an MRS request is performed through broadcasting and a relay terminal is selected from among terminals responding thereto.

Referring to a process of requesting and accepting MRS, the MRS request base station 301 initially transmits terminal request information for performing the MRS function through a broadcasting scheme. In this instance, two correspondence schemes may be employed.

First, when no cooperation is performed between base stations, the MRS request base station 301 broadcasts terminal request information only over a network of the MRS request base station 301. The above scheme may obtain only information of a communication scheme activated in a multimode terminal supporting the MRS function and needs to connect a corresponding communication module based on a predetermined time unit in order to verify an MRS request of other communication schemes. Accordingly, additional power consumption may occur.

Second, the MRS request base station 301 shares terminal request information required by the MRS request base station 301 with other base stations and broadcasts the terminal request information over a network of each of the base stations. The above scheme may obtain the MRS request of various types of communication schemes through activated communication modules of multimode terminals that support the MRS function and thus, enables a more efficient operation.

Next, each of the terminals having verified the broadcast terminal request information verifies a corresponding channel state. When the channel state satisfies a level required by the MRS request, each of the terminals transmits the channel state to the MRS request base station 301. Here, the channel state basically indicates a channel state between the MRS request base station 301 and a terminal supporting the MRS. When the terminal supporting MRS is capable of measuring a channel state with the target terminal 320, the channel state may further include a channel state between the corresponding terminal and the target terminal 320.

Next, based on the transferred channel states, the MRS request base station 301 selects, as the relay terminal, the multimode terminal 310 to perform the MRS function. When all of the transmitted channel states are unsatisfactory, the MRS request base station 301 may repeat the above process by returning to an operation of broadcasting the MRS request again.

Next, the MRS request base station 301 requests the selected multimode terminal 310 to perform the MRS function. In response to the request, the multimode terminal 310 automatically performs the MRS function to relay communication between the MRS request base station 301 and the target terminal 320.

During the communication relay, both of the multimode terminal 310 that is performing the MRS function and the MRS request base station 301 may make a request for suspending the communication relay, which is the same as described above with reference to FIGS. 2B and 2C.

Figure 6:
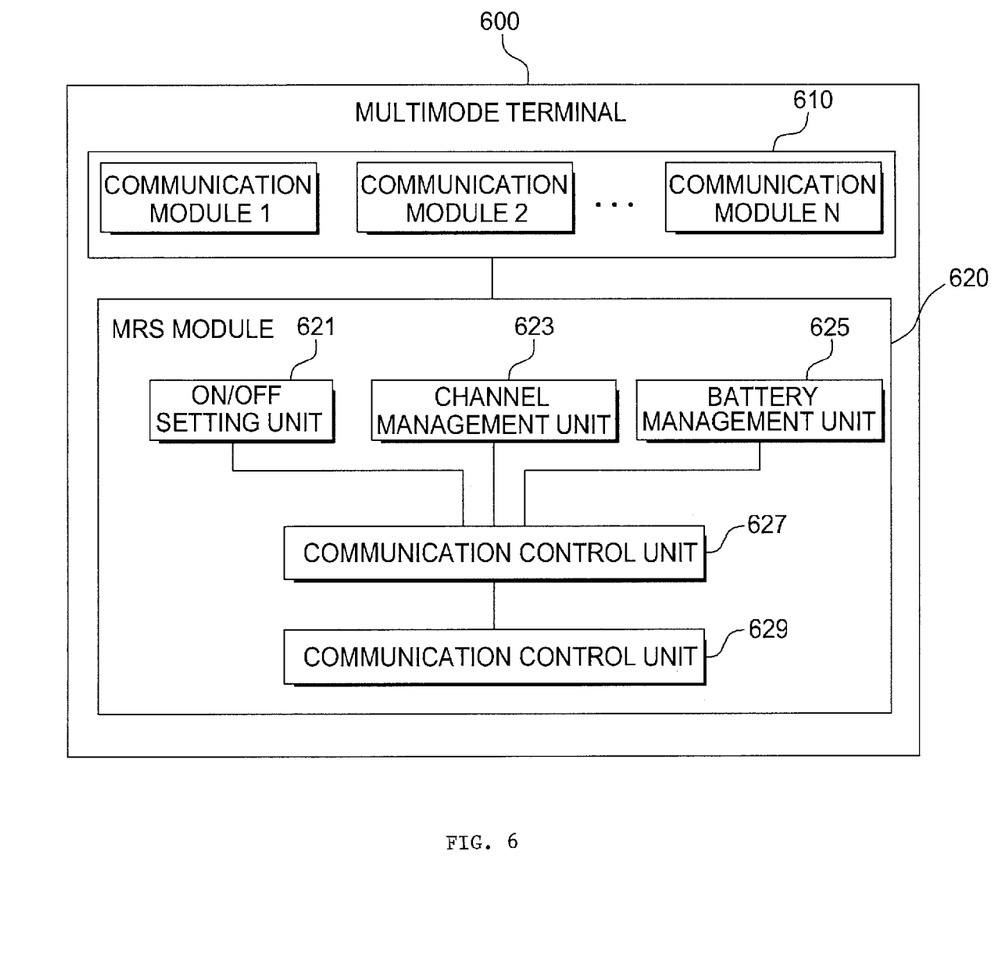
FIG. 6 is a configuration diagram of a multimode terminal according to an exemplary embodiment of the present disclosure.

FIG. 6 is a configuration diagram of a multimode terminal 600 according to an exemplary embodiment of the present disclosure.

Referring to FIG. 6, the multimode terminal 600 of the present disclosure includes a plurality of communication modules 610 to support a plurality of communication schemes, and an MRS module 620 to relay communication between a base station and a target terminal through a communication module that is not being currently utilized by a terminal among the plurality of communication modules 610, in response to a request of the base station.

The MRS module 620 may include an on/off setting unit 621 to provide a user with a setting function about whether to utilize an MRS function, a channel management unit 623 to determine whether a terminal is capable of performing the MRS function by measuring a channel state of the terminal with respect to a communication scheme requested by the base station, a battery management unit 625 to determine whether the terminal is capable of performing the MRS function by monitoring a remaining battery amount of the terminal, and a communication control unit 627 to relay communication between the base station and a target terminal, or to suspend the communication relay by accepting the request of the base station based on a setting state of the on/off setting unit 621 and the determination result of the channel management unit 623 and the battery management unit 625.

The MRS module 620 may further include a state display unit 629 to display whether the terminal is currently performing the MRS function, and/or resource usage amount information of the terminal through the communication relay.

A detailed function and operation method of a multimode terminal by each of constituent elements is the same as described above with reference to the first, second, and third exemplary embodiments.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of relaying communication using a multimode terminal, the method comprising:
   searching, by a base station, a group of terminals for terminals within the group that support a plurality of communication schemes;
   selecting, by the base station from among the group of searched terminals, a relay terminal that satisfies a predetermined condition for performing a multimode relay function;
   requesting, by the base station, the relay terminal to perform the multimode relay function; and
   relaying, by the relay terminal in response to the request of the base station, communication between the base station and a target terminal;
   wherein the relay terminal relays communication between the base station and the target terminal through a communication module that is not being currently utilised by the relay terminal among a plurality of communication modules,
   wherein at the same time of operating as a general mobile communication terminal using a predetermined communication scheme, the relay terminal performs the multimode relay function using a communication scheme different from the predetermined communication scheme.

2. The methods of claim 1, wherein the relay terminal performs either a downlink relay function or an uplink relay function, or performs both of the downlink relay function and the uplink relay function.

3. The method of claim 1, wherein the selecting, by the base station, the relay terminal that satisfies the predetermined condition comprising at least one of:
  verifying whether a terminal is providing the multimode relay function;
  verifying whether a channel state of the terminal is greater than or equal to a predetermined level; and
  verifying whether a remaining battery amount of the terminal is greater than or equal to a predetermined value.

4. The method of claim 1, further comprising:
  suspending the communication relay in response to a request of the base station or the relay terminal during the communication relay.

5. The method of claim 4, wherein when the communication relay is not required, or when a communication relay performance of the relay terminal is degraded to be less than the predetermined level, the base station makes a request for suspending the communication relay.

6. The method of claim 4, wherein when providing of the multimode relay function is suspended by a user, when the remaining battery amount is decreased to be less than the predetermined value, or when the channel state is degraded to be less than the predetermined level, the relay terminal makes a request for suspending the communication relay.

7. A method for relaying communication using a multimode terminal, the method comprising:
  requesting, by a relay request base station, a serving base station for cooperation of multimode relay;
  searching, by the serving base station in response to the cooperation request, a group of terminals for terminals within the group that support a plurality of communication schemes, and selecting a terminal candidate group that satisfies a predetermined condition;
  transferring, by the serving base station, a multimode relay request of the relay request base station to the terminals that belong to the terminal candidate group;
  transmitting, by the terminals of the terminal candidate group in response to the multimode relay request, respective channel state information of the terminals to the relay request base station;
  selecting, by the relay request base station, a relay terminal based on the transmitted channel state information of the terminals;
  requesting, by the relay request base station, the relay terminal to perform a multimode relay function;
  relaying, by the relay terminal in response to the request of the relay request base station, communication between the relay request base station and a target terminal; and
  wherein the relay terminal relays the communication between the serving base station and the target terminal through a communication module that is not being currently utilized by the relay terminal among a plurality of communication modules,
  wherein at the same time of operating as a general mobile communication terminal through communication with the serving base station using a predetermined communication scheme, the relay terminal performs the multimode relay function through communication with the relay request base station and the target terminal using a communication scheme different from the predetermined communication scheme.

8. The method of claim 7, wherein the selecting, by the serving base station, the terminal candidate group that satisfies the predetermined condition comprise at least one of:
  verifying whether a terminal is positioned at a position accessible to the relay request base station and the target terminal;
  verifying whether the terminal supports a communication scheme requested by the relay request base station;
  verifying whether the terminal is providing the multimode relay function; and
  verifying whether a remaining battery amount of the terminal is greater than or equal to a predetermined value.

9. The method of claim 7, further comprising:
  Suspending the communication relay in response to a request of the relay request base station or the relay terminal during the communication relay.

10. The method of claim 9, wherein when the communication relay is not required, or when a communication relay performance of the relay terminal is degraded to be less than the predetermined level, the relay request base station makes a request for suspending the communication relay.

11. The method of claim 9, wherein when providing of the multimode relay function is suspended by a user, when the remaining battery amount is decreased to be less than the predetermined value, or when the channel state is degraded to be less than the predetermined level, the relay terminal makes a request for suspending the communication relay.

12. A multimode terminal, comprising:
  a plurality of communication modules to support a plurality of communication schemes;
  a multimode relay module to relay communication between a base station and a target terminal within a group of terminals through a communication module that is not being currently utilized among the plurality of communication modules, in response to a request of the base station; and
  wherein a relay terminal relays the communication between the base station and the target terminal through the communication module that is not being currently utilized by the relay terminal among the plurality of communication modules,
  wherein at the same time of operating as a general mobile communication terminal using a predetermined communication scheme, the relay terminal performs a multimode relay function using a communication scheme different from the predetermined communication scheme.

13. The multimode terminal of claim 12, wherein the multimode relay module comprise:
  an on/off setting unit to provide a user with a setting function about whether to utilize a multimode relay function;
  a channel management unit to determine whether a terminal is capable of performing the multimode relay function by measuring a channel state of the terminal with respect to a communication scheme requested by the base station;
  a battery management unit to determine whether the terminal is capable of performing the multimode relay function y monitoring a remaining battery amount of the terminal; and
  a communication control unit to relay communication between the base station and the target terminal, or to suspend the communication relay by accepting the request of the base station based on a setting state of the on/off setting unit and the determined result of the channel management unit and the battery management unit.

14. The multimode terminal of claim 13, wherein the multimode relay module further comprises:
  a state display unit to display whether the terminal is currently performing the multimode relay function, and/or resource usage amount information of the terminal through the communication relay.

* * * * *

UNITED STATES PATENT AND TRADEMARK OFFICE
CERTIFICATE OF CORRECTION

PATENT NO. : 8,934,905 B2  
APPLICATION NO. : 13/718520  
DATED : January 13, 2015  
INVENTOR(S) : Yunhee Cho et al.

Page 1 of 1

It is certified that error appears in the above-identified patent and that said Letters Patent is hereby corrected as shown below:

Title page, column 1, under the heading (72) Inventors, after "Seung-Hwan Lee, Daejeon (KR)" insert --Dong Seung Kwon, Daejeon (KR)--.

Signed and Sealed this  
Fourth Day of August, 2015

Michelle K. Lee  
*Director of the United States Patent and Trademark Office*